US00RE44584E

(19) United States
(12) Reissued Patent
Wilkinson

(10) Patent Number: US RE44,584 E
(45) Date of Reissued Patent: Nov. 12, 2013

(54) INFLATABLE CUSHIONING DEVICE WITH MANIFOLD SYSTEM

(75) Inventor: John W. Wilkinson, Bennington, VT (US)

(73) Assignee: M.P.L. Limited, Belize (BZ)

(21) Appl. No.: 10/202,138

(22) Filed: Jul. 23, 2002

Related U.S. Patent Documents

Reissue of:
(64) Patent No.: 6,269,505
Issued: Aug. 7, 2001
Appl. No.: 09/295,139
Filed: Apr. 20, 1999

(51) Int. Cl.
*A47C 27/10* (2006.01)

(52) U.S. Cl.
USPC ..... 5/713; 5/710; 5/654

(58) Field of Classification Search
USPC ..... 5/709–710, 713, 644, 654, 655.3, 420, 5/655.9
See application file for complete search history.

(56) References Cited

U.S. PATENT DOCUMENTS

| | | | | |
|---|---|---|---|---|
| 201,728 | A | 3/1878 | White | |
| 2,433,012 | A | 12/1947 | Zalicovitz | |
| 2,750,606 | A | 6/1956 | Freedlander et al. | |
| 2,779,034 | A | 1/1957 | Arpin | |
| 3,251,077 | A | 5/1966 | Beckman | |
| 3,263,247 | A | 8/1966 | Knittel et al. | |
| 3,633,228 | A | 1/1972 | Zysman | |
| 3,638,254 | A | 2/1972 | Falkenau | |
| 3,653,083 | A | 4/1972 | Lapidus | |
| 3,815,887 | A | 6/1974 | Curtis et al. | |
| 3,879,776 | A | 4/1975 | Solen | |
| 4,120,061 | A | 10/1978 | Clark | |
| 4,173,385 | A | 11/1979 | Fenn et al. | |
| 4,241,740 | A | 12/1980 | Brown | |
| 4,477,935 | A | 10/1984 | Griffin | |
| 4,488,322 | A | 12/1984 | Hunt et al. | |
| 4,605,582 | A | 8/1986 | Sias et al. | |
| 4,644,597 | A | 2/1987 | Walker | |
| 4,662,012 | A | 5/1987 | Torbet | |
| 4,679,264 | A * | 7/1987 | Mollura | 5/710 |
| 4,684,201 | A | 8/1987 | Hutter | |
| 4,686,722 | A | 8/1987 | Swart | |

(Continued)

FOREIGN PATENT DOCUMENTS

| | | | |
|---|---|---|---|
| EP | 0302579 | A1 | 2/1989 |
| EP | 0812555 | A2 | 12/1997 |

(Continued)

OTHER PUBLICATIONS

Application No. EP06719321 / Patent No. 1845823, Supplemental European Search Report dated Oct. 13, 2010. 7 pages.

(Continued)

*Primary Examiner* — Fredrick Conley
(74) *Attorney, Agent, or Firm* — Schmeiser, Olsen & Watts, LLP

(57) ABSTRACT

A cushioning device for a body support such as a mattress, seat, sofa, or the like where support is obtained from a fluid. The cushioning device is self-inflating, self-adjusting, and provides a low interface pressure under the entire contact surface of a patient. Shear force scraping damage is prevented by a sleeve apparatus. A support system apparatus provides separately adjustable pressure support zones. For physical therapy, an alternating pressure system provides alternating lifting and lowering pressure zones under a patient.

64 Claims, 13 Drawing Sheets

(56) References Cited

U.S. PATENT DOCUMENTS

| | | | | |
|---|---|---|---|---|
| 4,688,283 | A | 8/1987 | Jacobson et al. | |
| 4,698,864 | A | 10/1987 | Graebe | |
| 4,797,962 | A | 1/1989 | Goode | |
| 4,852,195 | A | 8/1989 | Schulman | |
| 4,895,352 | A | 1/1990 | Stumpf | |
| 4,908,895 | A | 3/1990 | Walker | |
| 4,989,283 | A | 2/1991 | Krouskop | |
| 4,995,124 | A | 2/1991 | Wridge, Jr. et al. | |
| 5,020,176 | A | 6/1991 | Dotson | |
| 5,023,967 | A | 6/1991 | Ferrand | |
| 5,029,939 | A | 7/1991 | Smith et al. | |
| 5,033,133 | A | 7/1991 | Nissen | |
| 5,051,673 | A | 9/1991 | Goodwin | |
| 5,052,068 | A | 10/1991 | Graebe | |
| 5,062,169 | A | 11/1991 | Kennedy et al. | |
| 5,070,560 | A | 12/1991 | Wilkinson | |
| 5,090,076 | A | 2/1992 | Guldager | |
| 5,090,077 | A | 2/1992 | Caden et al. | |
| 5,109,561 | A | 5/1992 | Schild | |
| 5,142,717 | A * | 9/1992 | Everard et al. | 5/709 |
| 5,249,318 | A | 10/1993 | Loadsman | |
| 5,267,364 | A | 12/1993 | Volk | |
| 5,345,629 | A | 9/1994 | Ferrand | |
| 5,375,273 | A | 12/1994 | Bodine, Jr. et al. | |
| 5,388,292 | A | 2/1995 | Stinson et al. | |
| 5,487,196 | A | 1/1996 | Wilkinson et al. | |
| 5,502,855 | A | 4/1996 | Graebe | |
| 5,539,942 | A | 7/1996 | Melou | |
| 5,542,136 | A | 8/1996 | Tappel | |
| 5,560,057 | A | 10/1996 | Madsen et al. | |
| 5,564,142 | A | 10/1996 | Liu | |
| 5,584,085 | A | 12/1996 | Banko | |
| 5,586,346 | A | 12/1996 | Stacy et al. | |
| 5,594,963 | A * | 1/1997 | Berkowitz | 5/713 |
| 5,611,096 | A | 3/1997 | Bartlett et al. | |
| 5,630,237 | A | 5/1997 | Ku | |
| 5,634,224 | A * | 6/1997 | Gates | 5/709 |
| 5,634,225 | A | 6/1997 | Miller, Sr. et al. | |
| 5,652,985 | A | 8/1997 | Wilkinson et al. | |
| 5,659,908 | A | 8/1997 | Nishino | |
| 5,699,570 | A | 12/1997 | Wilkinson et al. | |
| 5,701,622 | A * | 12/1997 | Biggie et al. | 5/713 |
| 5,787,531 | A | 8/1998 | Pepe | |
| 5,794,288 | A | 8/1998 | Soltani et al. | |
| 5,873,137 | A | 2/1999 | Yavets-Chen | |
| 5,893,184 | A | 4/1999 | Murphy | |
| 5,963,997 | A | 10/1999 | Hagopian | |
| 5,983,429 | A | 11/1999 | Stacy et al. | |
| 6,014,784 | A * | 1/2000 | Taylor et al. | 5/713 |
| 6,092,249 | A | 7/2000 | Kamen et al. | |
| 6,151,739 | A | 11/2000 | Meyer et al. | |
| 6,223,369 | B1 * | 5/2001 | Maier et al. | 5/713 |
| 6,269,505 | B1 | 8/2001 | Wilkinson | |
| 6,317,912 | B1 | 11/2001 | Graebe et al. | |
| 6,367,106 | B1 | 4/2002 | Gronsman | |
| 6,370,716 | B1 | 4/2002 | Wilkinson | |
| 6,461,695 | B1 | 10/2002 | Schaap | |
| 6,551,450 | B1 | 4/2003 | Thomas et al. | |
| 6,684,434 | B2 | 2/2004 | Ellis et al. | |
| 6,687,936 | B2 | 2/2004 | Graebe et al. | |
| 6,694,556 | B2 | 2/2004 | Stolpmann | |
| 6,804,848 | B1 | 10/2004 | Rose | |
| 6,826,795 | B2 | 12/2004 | Wilkinson | |
| 6,877,178 | B2 | 4/2005 | Chapman et al. | |
| D509,980 | S | 9/2005 | Martin et al. | |
| 6,976,281 | B2 | 12/2005 | Schunk et al. | |
| 7,434,283 | B2 | 10/2008 | Wilkinson et al. | |
| 7,617,554 | B2 | 11/2009 | Wilkinson | |
| 2001/0023511 | A1 | 9/2001 | Wilkinson | |
| 2002/0116766 | A1 | 8/2002 | Stolpmann | |
| 2003/0024051 | A2 | 2/2003 | Wilkinson | |
| 2003/0159219 | A1 | 8/2003 | Harrison et al. | |
| 2003/0208849 | A1 | 11/2003 | Wilkinson | |
| 2004/0068801 | A1 | 4/2004 | Wilkinson | |
| 2004/0222684 | A1 | 11/2004 | VanSickle | |
| 2005/0050637 | A1 | 3/2005 | Graebe | |
| 2005/0125905 | A1 | 6/2005 | Wilkinson | |
| 2005/0177952 | A1 | 8/2005 | Wilkinson et al. | |
| 2006/0085919 | A1 | 4/2006 | Kramer et al. | |
| 2006/0236464 | A1 | 10/2006 | Beck et al. | |
| 2008/0028534 | A1 | 2/2008 | Wilkinson | |

FOREIGN PATENT DOCUMENTS

| | | |
|---|---|---|
| JP | 03-267013 | 11/1991 |
| JP | 08-038559 | 2/1996 |
| WO | 94/09686 | 5/1994 |
| WO | 1994010881 | 5/1994 |
| WO | 9745038 A1 | 12/1997 |
| WO | 03073825 A2 | 9/2003 |

OTHER PUBLICATIONS

Atlantis Medical, Inc.; "ZAAM Zoned Adjustable Air Mattress"; ZAAM product brochure; published 1996; no volume, page or issue number; publisher Atlantis Medical, Inc.; published in New Brunswick, New Jersey.

Atlantis Medical, Inc.; "SAM self-adjusting mattress"; SAM product brochure; published 1997; no volume, page or issue number; publisher Atlantis Medical, Inc.; published in New Brunswick, New Jersey.

Lotech Support Systems Limited; "LoTech Air 2000"; LoTech Air 2000 product brochure; published 1995; number volume, page or issue number; publisher LoTech Support Systems Limited; published in Bennington, Vermont.

Atlantis Medical, Inc.; "SAM self-adjusting mattress"; SAM product brochure; published 1996; no volume, page or issue number; publisher Atlantis Medical, Inc.; published in New Brunswick, New Jersey.

Atlantis Medical, Inc.; "SAM self-adjusting mattress"; SAM product brochure; published 1996; no volume, page or issue number; publisher Atlantis Medical, Inc.; published in Washington, DC area by filing in the USPTO on Mar. 11, 1996.

BG Industries, Inc.; "AccuMax PC Self Adjusting Pressure Management System"; published 1998; no volume, page or issue number; publisher BG Industries, Inc.; published in Northridge, California.

Comfort Direct, Inc.; "Comfort Direct For All Your Comfort Needs"; Comfort Direct product Catalogue, pp. 1, 2, 3; published in 2000; publisher Comfort Direct, Inc.; published in New Brunswick, New Jersey.

Direct Supply, Inc.; "Capital Equipment"; Direct Supply product catalogue; vol. 728OR, p. 6, front cover, back cover; publisher Direct Supply, Inc.; published 2004; published in Milwaukee, Wisconsin.

KCI, Inc.; "Atmos Air Atmospheric Therapy"; KCI seating cushion brochure and owner's guide; no volume, page or issue number; published 2000; publisher KCI, Inc.; published in San Antonio, Texas.

KCI, Inc.; "Atmos Air with SAT"; KCI Atmos Air brochures for 4000MRS, 9000MRS, 9000A MRS; 9000AR MRS and APOD25; no volume, page or issue number, published 2004; publisher KCI, Inc.; published in San Antonio, Texas.

Office Action (Mail Date Jul. 20, 2010) for U.S. Appl. No. 11/841,047, filed Aug. 20, 2007.

Application No. PCT/US00/10575, Supplemental International Search Report and the Written Opinion of the International Searching Authority, or the Declaration dated Feb. 19, 2002. 6 pages.

Application No. PCT/US00/10575, International Search Report dated Aug. 14, 2000. 1 page.

Application No. EP 00 92 8223, European Search Report dated Oct. 8, 2004. 4 pages.

Application No. PCT/US06/02411, International Search Report and the Written Opinion of the International Searching Authority, or the Declaration dated May 3, 2006. 9 pages.

Application No. PCT/US05/04293, International Search Report and the Written Opinion of the International Searching Authority, or the Declaration dated Apr. 25, 2007. 8 pages.

Application No. EP 05 71 3316, European Search Report dated Jun. 2, 2010. 6 pages.

(56) References Cited

OTHER PUBLICATIONS

Office Action (Mail Date Oct. 18, 2005) for U.S. Appl. No. 11/041,758, filed Jan. 24, 2005.
Office Action (Mail Date Apr. 12, 2006) for U.S. Appl. No. 11/041,758, filed Jan. 24, 2005.
Office Action (Mail Date Apr. 16, 2008) for U.S. Appl. No. 11/041,758, filed Jan. 24, 2005.
Office Action (Mail Date Dec. 3, 2009) for U.S. Appl. No. 11/041,758, filed Jan. 24, 2005.
Office Action (Mail Date Dec. 5, 2003) for U.S. Appl. No. 10/404,952, filed Mar. 31, 2003.
Office Action (Mail Date Jul. 28, 2004) for U.S. Appl. No. 10/404,952, filed Mar. 31, 2003.
Office Action (Mail Date Jan. 12, 2005) for U.S. Appl. No. 10/404,952, filed Mar. 31, 2003.
Office Action (Mail Date Sep. 12, 2005) for U.S. Appl. No. 10/404,952, filed Mar. 31, 2003.
Office Action (Mail Date Apr. 28, 2006) for U.S. Appl. No. 10/404,952, filed Mar. 31, 2003.
Office Action (Mail Date Dec. 22, 2006) for U.S. Appl. No. 10/404,952, filed Mar. 31, 2003.
Office Action (Mail Date Jun. 8, 2007) for U.S. Appl. No. 10/404,952, filed Mar. 31, 2003.
Office Action (Mail Date Jan. 21, 2001) for U.S. Appl. No. 11/841,047, filed Aug. 20, 2007.
Decision on Appeal (Mail Date Aug. 9, 2011) for U.S. Appl. No. 10/404,962, filed Mar. 31, 2003.

* cited by examiner

INFLATABLE CUSHIONING DEVICE WITH MANIFOLD SYSTEM

Matter enclosed in heavy brackets [ ] appears in the original patent but forms no part of this reissue specification; matter printed in italics indicates the additions made by reissue.

FIELD OF THE INVENTION

The present invention relates generally to an inflatable cushioning device for body supports such as a mattress, sofa, or chair cushion. In particular, the present invention relates to a body support for preventing the formation of pressure induced soft tissue damage.

BACKGROUND OF THE INVENTION

Heretofore, inflatable cushioning devices for use with body supports, such as a mattress, sofa, seat, or the like, typically included a plurality of air cells or bladders that are inflated to support a person. The air cells provide support to the person, and can be inflated to a desired pressure level to provide the person with a predetermined level of comfort and support.

In the medical field, cushioning devices including a plurality of air cells are often used to provide different levels of support under various portions of a patient's body. For example, a mattress may include separate air cells located in the upper, middle, and lower portions of the mattress. These air cells can be inflated to different pressures to support the upper, middle, and lower portions of the patient's body with different pressures.

In hospitals which provide care to patients confined to a bed for extended periods of time, the patients often suffer from the effects of excess pressure transmitted to their bodies. As known in the medical field, continuous pressure applied to a patient's body can cause soft tissue damage. When the external pressure exerted on the patient's skin causes blood carrying capillaries to close, soft tissue degeneration may occur. This soft tissue damage may lead to the formation of pressure sores. For example, continuous pressure applied to a patient's heel can cause a pressure sore to develop on the heel. The multi-cell cushioning devices described above can be used to relieve the pressure applied to a specific portion of a patient's body. In the case of a patient's heel, for example, this may be accomplished by inflating the air cell under the patient's leg so that the heel is lifted from the mattress. Thus, the continuous heel pressure is relieved and the formation of a bed sore on the heel is prevented.

Air cushion devices typically require an external pump to inflate the air cells in the device. Alternatively, the air cushion devices are pre-inflated in the manufacturing plant and are shipped to a field location for use A problem may develop when the atmospheric pressure at the inflation location is different from the atomospheric pressure at the field location where the device is used. For example, if the field location atmospheric pressure is lower than the atmospheric pressure at the inflation location, the air cells in the field will expand and become firmer.

Hospitals rate pressure relief support systems as "treatment products" if they sufficiently reduce the pressure upon a patient's body, reduce tissue trauma, and facilitate the healing of skin ailments, such as burns, pressure sores, etc. Typical pressure relief support systems which qualify as "treatment products" are embodied in beds which contain motors and pumps to vary the shape and pressure within the mattress.

Such beds are very expensive and require the operator to undergo extensive training to learn how to use and operate the system. Furthermore, the "treatment products" often require extensive maintenance due to the failure of the numerous moving mechanical parts. Also, these complicated pressure relief support systems cannot be used on typical box spring mattress supports, and require specialized bed frames. The complicated design of these beds makes their repair very difficult, and often requires the complete replacement of the entire system for proper servicing. A further difficulty is that during power outages, these mattresses lose pressure leaving a patient on a hard surface to develop pressure sores if action is not taken. Thus, a need exists to arrive at a body support which adequately addresses these disadvantages.

SUMMARY OF THE INVENTION

The present invention provides a cushioning device for a mattress, seat, sofa, or the like where support is obtained from a fluid such as atmospheric air. The cushioning device has few moving parts, is user controllable, requires minimal maintenance, and is easily repairable. The cushioning device of the present invention includes a support system apparatus, a sleeve apparatus, a jacket, a topper cushion, and an outer cover.

The support system apparatus includes at least one support cell for providing lifting support for a body. Each support cell includes an envelope containing a fluid. Application of an external load on an outer surface of the envelope causes the envelope to deform into a compressed form. The envelope includes a reforming element that is capable of providing a reforming force to the interior surface of the envelope, to return the envelope to its original unloaded form. The reforming element is preferably made from a resilient foam material, however, other resilient means can be used.

[An intake valve and an exhaust valve are included in each support cell. The exhaust valve in each support cell is connected to an exhaust control system. The intake valve in each support cell is connected to an intake control system.] Each intake valve includes an intake check valve allowing fluid to flow into the support cell, while preventing fluid from flowing out of the support cell. Each exhaust valve includes an exhaust check valve allowing fluid to flow out of the support cell, while preventing fluid from flowing into the support cell. The intake control system is connected to a fluid supply reservoir. The exhaust control system is connected to a fluid exhaust reservoir. Preferably, the fluid included in the supply and exhaust reservoirs is air, however, any suitable fluid, e.g., water or nitrogen, can be used. The fluid supply and exhaust reservoirs may comprise the same reservoir, and may comprise an ambient source of fluid such as atmospheric air.

In use, the weight of a body of a person, patient, or animal resting on the envelope deforms the envelope For illustration purposes, a patient will be used as an example of body resting on a the envelope. The pressure of the fluid within the envelope increases as the volume of the envelope decreases under deformation. As the pressure of the fluid increases, the fluid in the envelope flows out of the envelope through the exhaust valve and into the exhaust control system. Next, the fluid flows from the exhaust control system into the fluid exhaust reservoir. Furthermore, as the envelope deforms to conform to the irregular shape of the patient, the area of the envelope supporting the load increases. Equilibrium is achieved when the forces within the envelope, including the pressure of the fluid within the envelope multiplied by the area of the envelope supporting the load, plus the force provided by the reforming element equal the weight of the load.

A controllable pressure relief valve is included in the exhaust control system so that a maximum pressure level of the fluid within the envelope can be set and maintained. Different selected maximum pressure levels of the fluid allow the support cell to accommodate different weights or allow different degrees of conformation between the patient and the envelope surface. Preferably, the maximum pressure level of the fluid is set to ensure that the interface pressure under the entire contact surface of the patient is below the pressure that may cause soft tissue damage such as pressure sores to occur.

As the weight of the patient is removed from the support cell, the reforming element exerts an outward force on the interior surface of the envelope. As the envelope expands, a partial vacuum is created in the interior space of the envelope, causing fluid to be drawn back into the interior space of the envelope. The fluid is drawn from the fluid supply reservoir into the intake control system, through the intake valve, and into the interior space of the envelope. The intake valve includes a one way intake check valve that permits fluid to re-enter the interior space of the envelope, while preventing fluid from exiting the interior space of the envelope.

The support cells included in the present invention can use atmospheric pressure as the pressure source for inflation. Therefore, when the fluid supply and exhaust reservoirs comprise atmospheric air, inflation can be accomplished without the need for expensive blowers, pumps or microprocessors as required by previously available "treatment products." A plurality of support cells can be interconnected with the intake control system and the exhaust control system to create a support system apparatus. The support system apparatus can support a patient by providing self adjusting pressure management to the entire contact surface of the patient. The support system apparatus provides a low interface pressure under the entire surface of the patient being supported. For example, if the patient is lying on the support system apparatus, the support system apparatus ensures that the interface pressure under the entire contact surface of the patient is below the pressure that may cause soft tissue damage to occur.

The support system apparatus also has the ability to self-adjust every time a patient moves, or is repositioned on the support system apparatus. When the pressure distribution applied to the support system apparatus changes, the support cells within the support system apparatus automatically inflate or deflate as necessary, to maintain a low interface pressure under the entire patient.

Another embodiment of the current invention provides for separately controlled support zones within the support system apparatus. Each support zone comprises at least one support cell. Each support cell includes at least one intake valve and at least one exhaust valve. The intake valve for each support cell in each support zone is connected to the intake control system. The exhaust valves from each support cell in a single support zone are connected to a single exhaust control system. Each support zone has a separate exhaust control system. The intake control system is connected to the fluid supply reservoir. The exhaust control system for each support zone is connected to the fluid exhaust reservoir. Generally the pressure level in each support zone is set at a different level. For example, if the support system apparatus comprises a mattress in a bed, the upper, middle, and lower zones of the support system apparatus can be set to provide a different level of pressure or firmness for the upper, middle, and lower portions of the patient's body.

The sleeve apparatus includes a cell cover surrounding each support cell. For a plurality of support cells, each cell cover is attached to an adjacent cell cover. The cell cover allows the surface of the envelope of the support cell to slide freely along a first side of the cell cover, without transmitting this sliding movement to a second side of the cell cover. The second side of the cell cover can be the side on which a patient is lying. Therefore, movement of the support cell is not transmitted to the patient, thereby preventing frictional or shear force abrasion damage to the skin of the patient. In the event that repair of a support cell becomes necessary, the sleeve apparatus allows each support cell to be easily removed and replaced.

Another embodiment of the present invention provides an additional alternating pressure system for providing alternating supply pressure to a plurality of zones. The alternating pressure system can be used in combination with the support system apparatus. Each zone includes at least one support cell. The alternating pressure system includes a pressurized fluid supply source including a pump, a pressurized fluid tank, etc. Additionally, the alternating pressure system includes a control system for sequentially supplying fluid pressure to the plurality of zones. The raising and lowering of the alternating zones under a patient provides beneficial movement of the skeleton and tissue in the patient. The movement helps stimulate circulation and lymph fluid movement in the patient. When the alternating pressure system is deactivated or fails, the support system apparatus continues to provide self adjusting pressure management to the patient's body.

The jacket houses the support system apparatus, the intake and exhaust control systems, and portions of the alternating pressure system. The jacket can be made from any suitable stretchable material, and is preferably is formed from a stretchable fabric material.

The topper cover provides further resilient torso support. The topper cover may be formed from a layered fiber filled material or other suitable material. The topper may include a resilient heel support unit to reduce pressures on the sensitive heel region of a patient. The topper cover may rest above the jacket, and may be covered by the outer cover. Alternatively, the topper cover may rest above the support system apparatus.

The outer cover provides a low friction and low shear surface further protecting the patient from frictional tissue damage. Additionally, the outer cover provides a waterproof and stain resistant surface. For medical uses the outer cover can be made from an anti-microbial type material.

The cushioning device of the present invention allows a user in the field to adjustably set the maximum pressure level in each support cell. When surrounded by atmospheric air, the support system apparatus is self-inflating, self-adjusting, and does not require expensive pumps and control systems as required by related "treatment product" art. Also, since there are fewer moving parts in the present invention, maintenance and repairs are simple and reasonable in cost compared to the complex related art.

The cushioning device of the present invention can be used in combination with any support device where self adjusting dynamic pressure support of the person or patient is required. For example, these support devices can be mattresses, sofas, seats, etc.

Generally, the cushioning device of the present invention comprises:

- a plurality of fluid cells; and
- a non-powered manifold system, operatively attached to the plurality of fluid cells.

The present invention additionally provides a cushioning device comprising:

- a plurality of self-inflating fluid cells;
- a manifold system, operatively attached to the plurality of self-inflating fluid cells; and means, operatively attached to the self-inflating fluid cells for adjusting the firmness or softness of all of the fluid cells.

The present invention additionally provides a cushioning device comprising:

a plurality of self-inflating fluid cells;

a manifold system, operatively attached to the plurality of self-inflating fluid cells; and a pressure regulator attached to the manifold system.

The present invention additionally provides a cushioning device comprising:

a plurality of fluid cells;

a pressure regulator; and a manifold system, operatively attached to each of the fluid cells, wherein the fluid cells do not communicate with each other through the manifold and all fluid cells communicate with the pressure regulator.

The present invention provides a method for supporting a body comprising:

providing a plurality of non-powered self-inflating fluid cells;

applying a body weight to the non-powered self-inflating fluid cells; and allowing each of the non-powered self-inflating fluid cells to react to the body weight and adjust to an identical internal pressure.

BRIEF DESCRIPTION OF THE DRAWINGS

The features of the present invention will best be understood from a detailed description of the invention and a preferred embodiment thereof selected for the purposes of illustration and shown in the accompanying drawings in which.

DETAILED DESCRIPTION OF THE INVENTION

Figure 1:
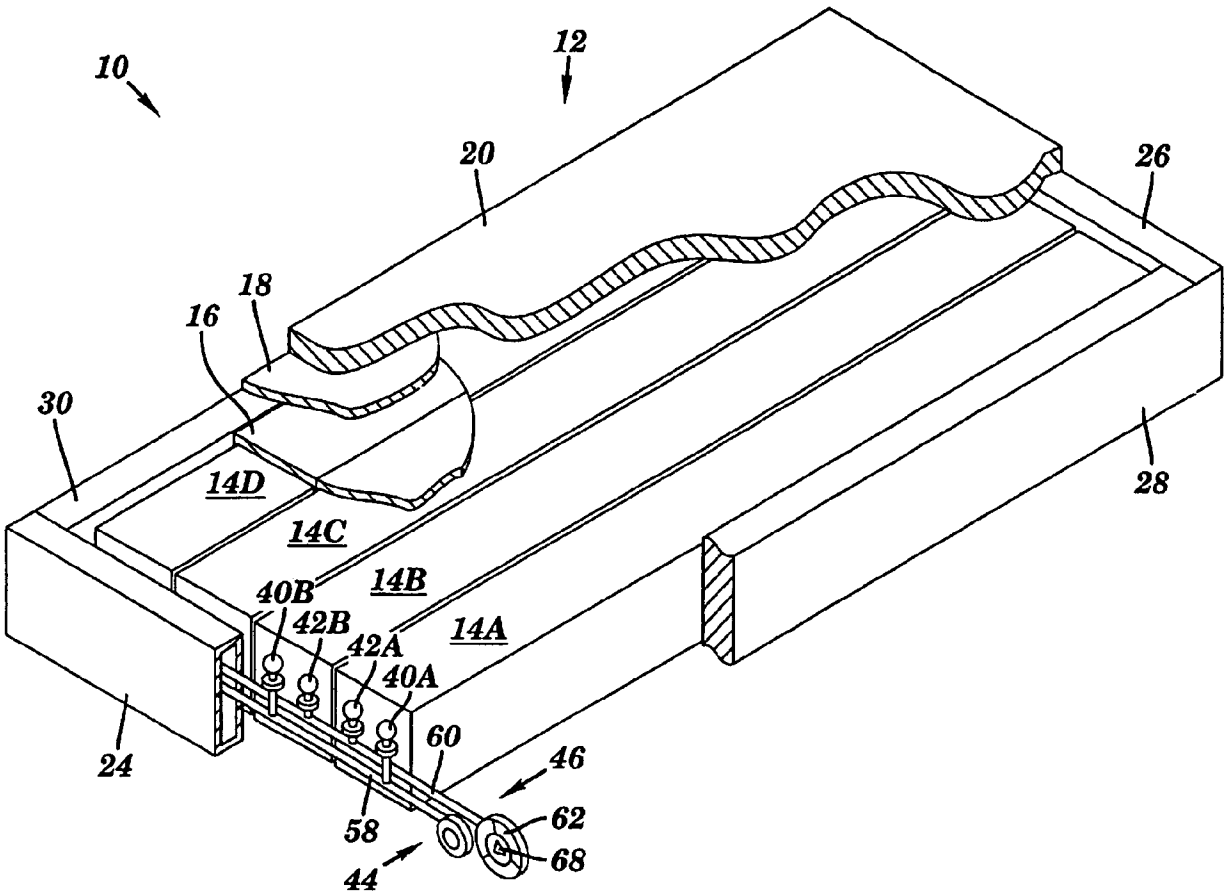
FIG. 1 illustrates a perspective view of an inflatable cushioning device of the present invention.

Although certain preferred embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of the preferred embodiment. The features and advantages of the present invention are illustrated in detail in the accompanying drawings, wherein like reference numerals refer to like elements throughout the drawings. Although the drawings are intended to illustrate the present invention, the drawings are not necessarily drawn to scale.

Referring to FIG. 1, there is illustrated a perspective view of a cushioning device 10 in accordance with a preferred embodiment of the present invention. The cushioning device 10 can be used in combination with any support device where self-adjusting dynamic pressure support of a person or patient 56 (FIG. 14) is required. For example, the support device may include a mattress, sofa, seat, etc. The cushioning device 10 includes a support system apparatus 12 comprising at least one support cell 14, a sleeve apparatus 16 (FIG. 5), a jacket 18 (FIG. 5), and a topper cushion 20.

The support system apparatus 12 includes at least one support cell 14 for providing lifting support for a patient 56. An intake valve 40 and an exhaust valve 42 are included in each support cell 14. As illustrated in FIG. 1, the cushion device 10 also includes two end walls 24, 26, and two side walls 28, 30. The end walls 24, 26, and the side walls 28, 30 can be formed from a resilient material such as foam or rubber. The topper cushion 20 rests on top of the jacket 18 and provides further cushioning to a body. The topper cushion 20 can be composed of any resilient material, for example, foam, down feathers, an inflatable air cushion, etc.

Figure 2:
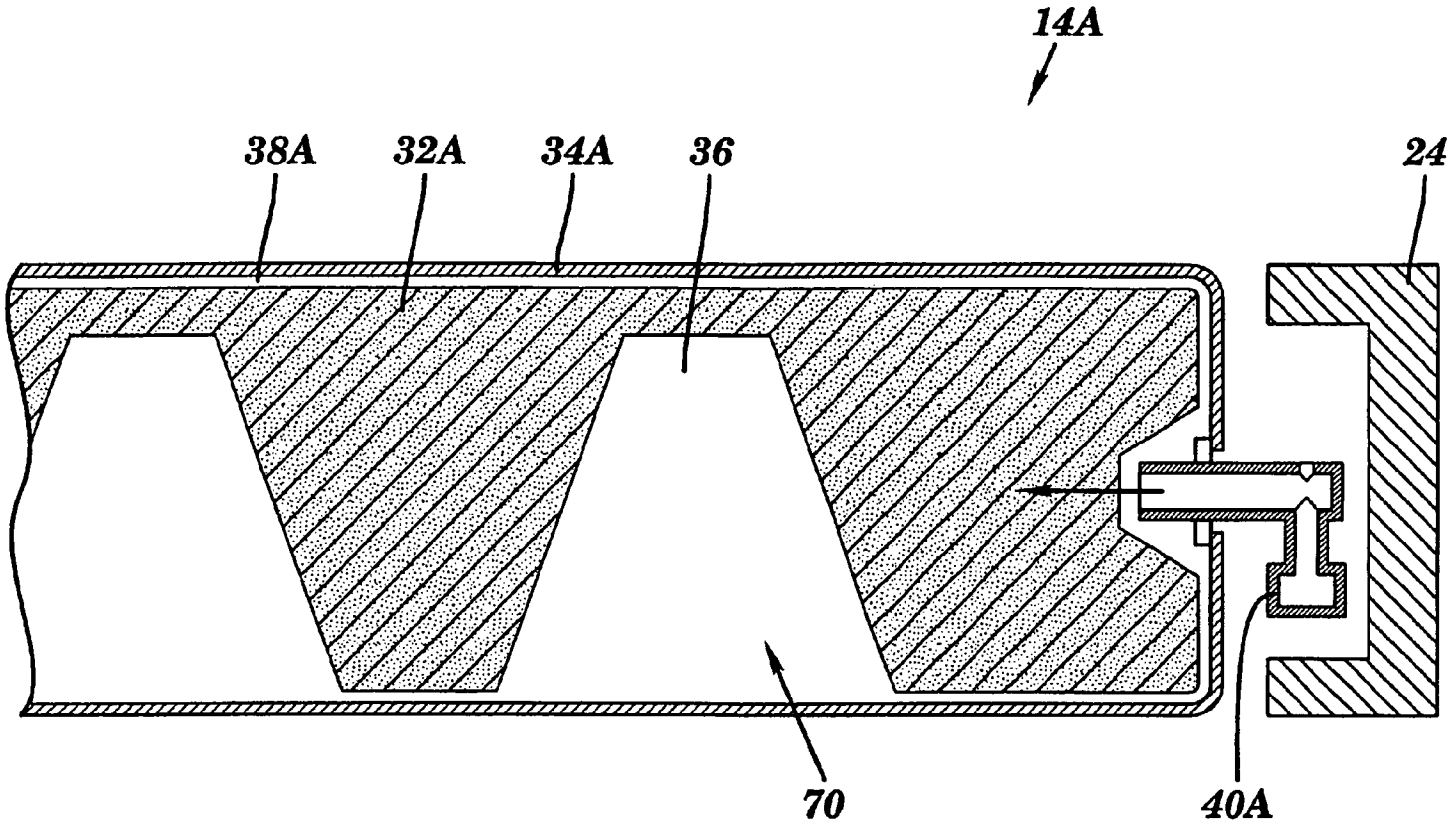
FIG. 2 illustrates a partial cross-sectional view of a support cell including a reforming element and an intake valve.
Figure 17:
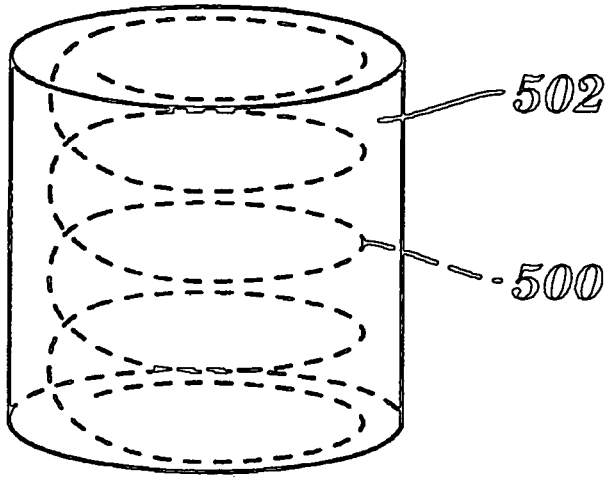
FIG. 17 illustrates a perspective view of a coiled spring resilient support.
Figure 18:
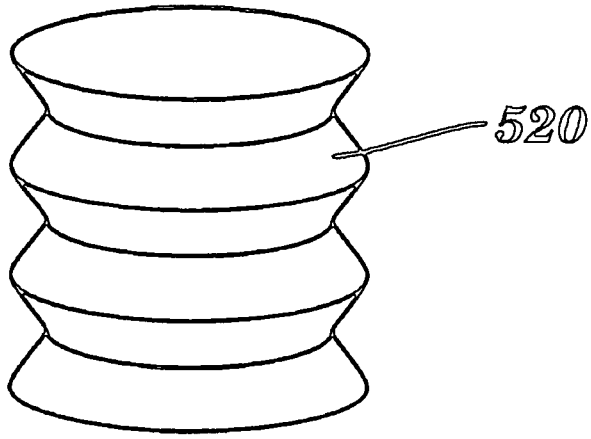
FIG. 18 illustrates a perspective view of a bellows resilient support.

FIG. 2 illustrates a partial cross-sectional view of the support cell 14A including an envelope 34A and a reforming element 32A. The envelope 34A contains a fluid 36. The application of an external load on the envelope 34A causes the envelope 34A to deform into a compressed form. The reforming element 32A provides a reforming force to the interior surface 38A of the envelope 34A. The reforming force causes the envelope 34A to return to its original form when the external load is removed from the envelope 34A. The reforming element 32A is preferably a resilient foam material, however, other resilient means can be used such as a coiled spring 500 (FIG. 17) or a bellows 520 (FIG. 18). The coiled spring 500 is surrounded by a resilient material 502. The bellows 520 may be formed from a pliable resilient material such as plastic and filled with a fluid such as air.

Figure 3:
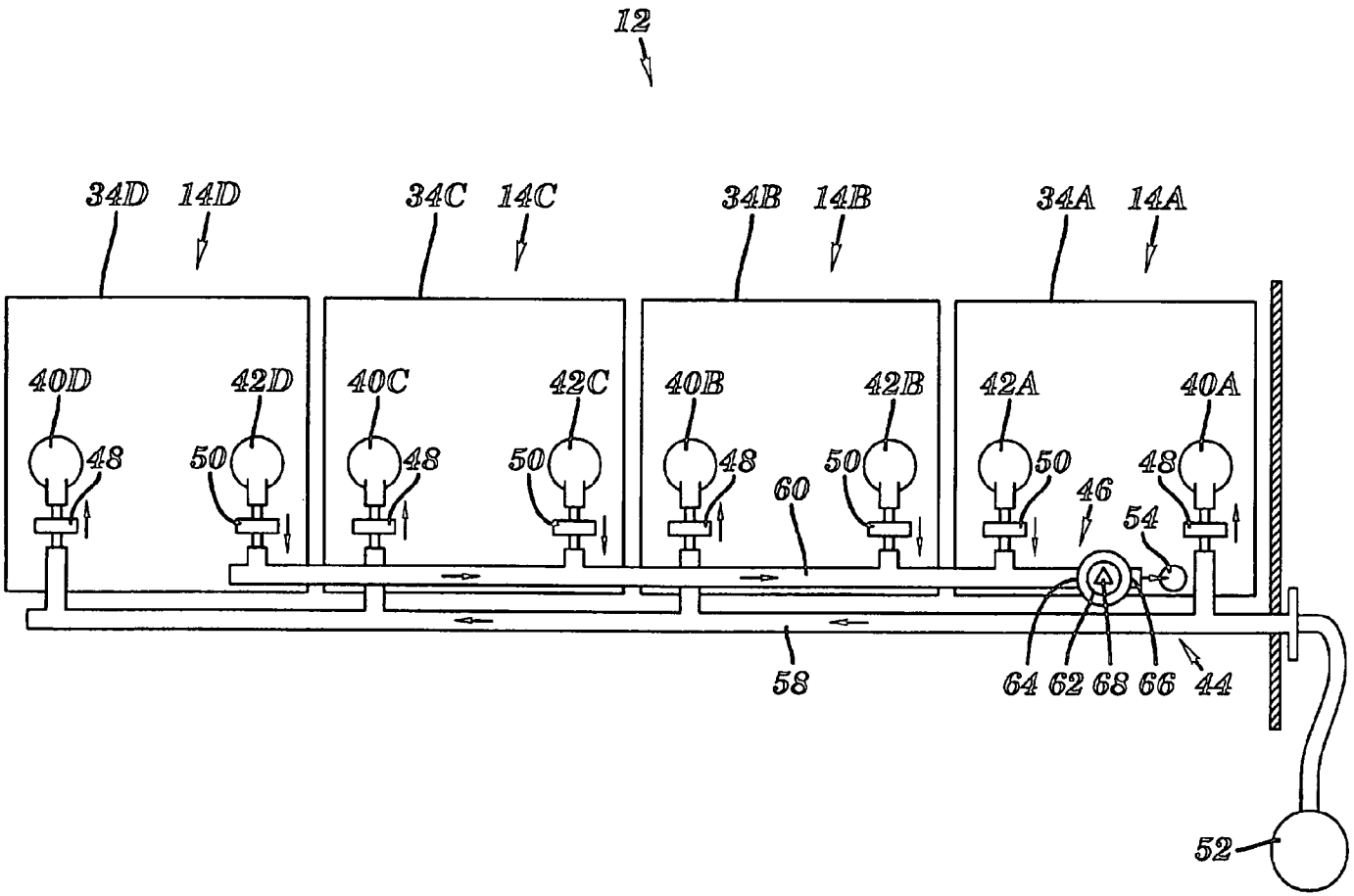
FIG. 3 illustrates an end view of a support system apparatus.

An example of a support system apparatus 12 for a mattress includes a plurality of support cells 14A, 14B, 14C, and 14D is illustrated in FIGS. 1 and 3. Intake valves 40A, 40B, 40C, 40D, and exhaust valves 42A, 42B, 42C and 42D are also illustrated in FIG. 3. Each intake valve 40 includes an intake check valve 48 allowing fluid 36 to flow into the support cell 14, while preventing fluid 36 from flowing out of the support cell 14. Each exhaust valve 42 includes an exhaust check valve 50 allowing fluid 36 to flow out of the support cell 14, while preventing fluid 36 from flowing back into the support cell 14 Each exhaust valve 42 is connected to an exhaust conduit 60 included in an exhaust control system 46. Each intake valve 40 is preferably connected to an intake conduit 58 included in an intake control system 44.

The intake control system 44 is connected to a fluid supply reservoir 52. The exhaust control system 46 is connected to a fluid exhaust reservoir 54. Generally, the fluid 36 included in the fluid supply reservoir 52 and the fluid exhaust reservoir 54 is air, however, any suitable fluid 36 (e.g. water or nitrogen) can be used. The fluid supply reservoir 52 and the fluid exhaust reservoir 54 may comprise the same reservoir, and may comprise an ambient source of fluid 36 such as atmospheric air.

Figure 14:
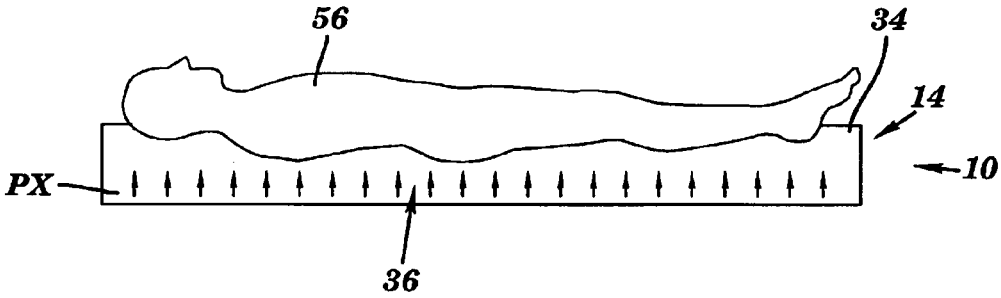
FIG. 14 illustrates a cross-sectional view of the patient being supported by the cushioning device of the present invention, wherein a low interface pressure is provided under the patient.

As illustrated in FIG. 14, the weight of a body such as a patient 56 resting on the cushion device 10 deforms the envelope 34 in each support cell 14. The pressure of the fluid 36 within each envelope 34 increases as the volume of the envelope 34 decreases under deformation. As the pressure of the fluid 36 increases, the fluid 36 in each envelope 34 flows out of the envelope 34 through a corresponding exhaust valve 42 and into the exhaust control system 46 (FIGS. 1 and 3). Next, the fluid 36 flows from the exhaust control system 46 into the fluid exhaust reservoir 54. Furthermore, as each envelope 34 deforms to conform to the irregular shape of the patient 56, the area of the envelope 34 supporting the load increases. Equilibrium is achieved when the forces within the envelope 34, including the pressure of the fluid 54 within the envelope 34 multiplied by the area of the envelope 34 supporting the load, plus the force provided by the reforming element 32, equal the weight of the load.

As illustrated in FIG. 3 a controllable pressure relief valve 62 is included in the exhaust control system 46 and is attached to an end 64 of the exhaust conduit 60. The outlet 66 of the controllable pressure relief valve 62 is attached to the fluid exhaust reservoir 54. The controllable pressure relief valve 62 controls the maximum pressure level of the fluid 36 in the exhaust conduit 60 and in each envelope 34 in each support cell 14. A rotatable knob 68 or other adjusting mechanism on the controllable pressure relief valve 62 allows a user to adjust the regulated maximum pressure level. Different selected maximum allowable pressures in the support cells 14A, 14B, 14C, and 14D allow the support system apparatus 12 to accommodate patients 56 of different weights. Also, the setting of different maximum allowable pressures in the support cells 14A, 14B, 14C, and 14D allows different degrees of conformation between the patient 56 and the surface of each envelope 34. The maximum pressure is preferably set to ensure that the interface pressure under the entire contact surface of the patient 56 is below the pressure that may cause tissue damage. The cushioning device 10 of the present invention allows a user in the field to adjustably set the maximum pressure level in each support cell 14. The maximum pressure is preferably above about 6 inches of water but is optimally in the range of about 8 to 12 inches of water. Other ranges may also be used, depending on operational requirements, user preferences, etc.

Figure 13:
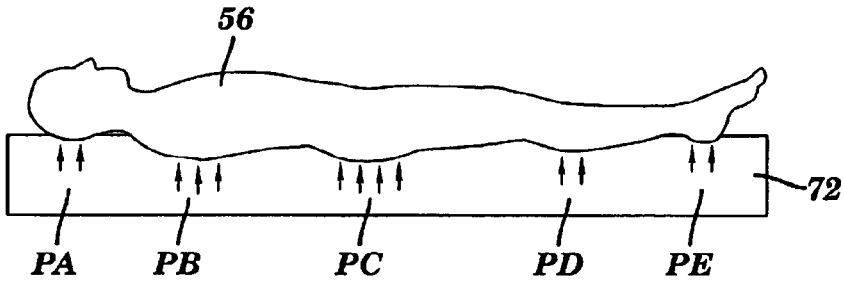
FIG. 13 illustrates a cross-sectional view of a patient lying on a conventional mattress.

FIG. 13 illustrates the patient 56 resting on a conventional mattress 72. High pressure regions on the patient 56 are indicated by the force arrows PA, PB, PC, PD, and PE. FIG. 14 illustrates the patient 56 resting on a cushion device 10 of the present invention. As shown, the cushion device 10 provides a low uniform interface pressure PX that supports the entire contact surface of the patient 56. This interface pressure is below the pressure that may cause tissue damage, thereby preventing the formation of pressure sores and other injuries.

As the weight of the patient 56 is removed from each support cell 14, the reforming element 32 (FIG. 2) in each envelope 34 exerts a reforming force on the interior surface 38 of each envelope 34. As each envelope 34 expands, a partial vacuum is created in the interior space 70 of each envelope 34. The vacuum draws the fluid 36 from the fluid supply reservoir 52 into the intake control system 44. Next, the fluid 36 is drawn from the intake control system 44 through a corresponding intake valve 40 into the interior space 70 of each envelope 34 When the fluid supply reservoir 52 and the fluid exhaust reservoir 54 comprise atmospheric air, inflation can be accomplished without the need for expensive blowers, pumps or microprocessors as required by previously available "treatment products." The support system apparatus 12 of the present invention also has the ability to self-adjust every time a patient 56 moves, or is repositioned on, the support system apparatus 12. When the pressure distribution applied to the support system apparatus 12 changes, the support cells 14 within the support system apparatus 12 automatically inflate or deflate to restore the low interface pressure PX under the entire patient (FIG. 14).

Figure 4:
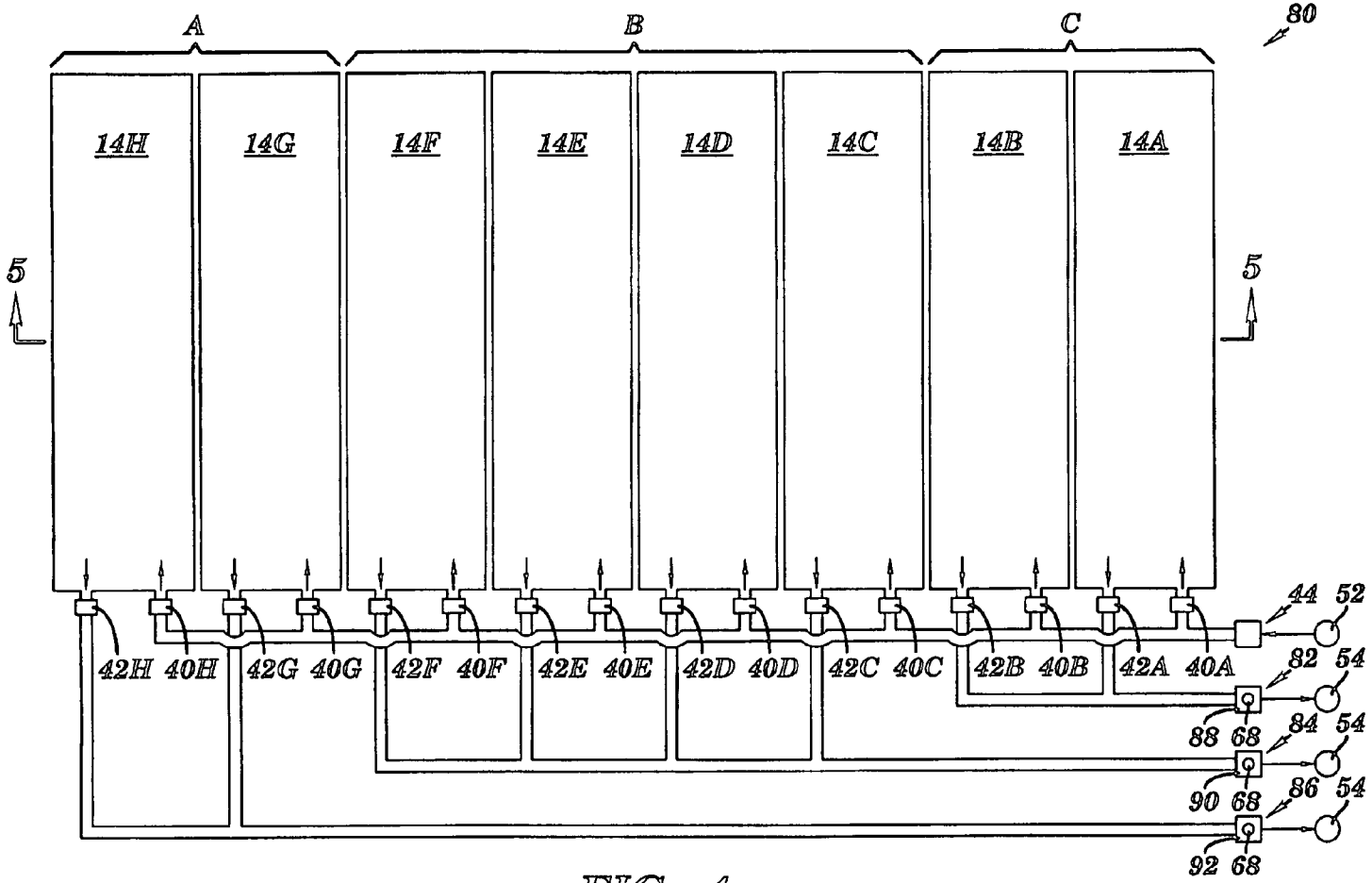
FIG. 4 illustrates a plan view of another embodiment of the support system apparatus including a plurality of controlled support zones.

Another embodiment of the present invention is illustrated in FIG. 4 and provides for separately controlled support zones "A," "B," and "C" within a support system apparatus 80. Each support zone "A," "B," and "C" includes at least one support cell 14. Each support cell 14 includes at least one intake valve 40 and at least one exhaust valve 42. As illustrated in FIG. 4, each intake valve 40A-40H is connected to the intake control system 44. The exhaust valves 42A and 42B in zone "C" are connected to an exhaust control system 82. The exhaust valves 42C, 42D, 42E and 42F in zone "B" are connected to an exhaust control system 84. The exhaust valves 42G and 42H in zone "A" are connected to an exhaust control system 86. Each intake valve 40A-40H allows fluid 36 to flow into each support cell 14A-14H, respectively, while preventing fluid 36 from flowing back out of each support cell 14A-14H, respectively. Each exhaust valve 42A-42H allows fluid 36 to flow out of each support cell 14A-14H, respectively, while preventing fluid 36 from flowing back into each support cell 14A-14H, respectively. The intake control system 44 is connected to the fluid supply reservoir 52. The exhaust control systems 82, 84, and 86 are connected to the fluid exhaust reservoir 54. Generally, the fluid 36 included in the fluid supply reservoir 52 and the fluid exhaust reservoir 54 is atmospheric air, however, other fluids 36 can be used.

Each exhaust control system 82, 84, and 86 includes a pressure relief valve 88, 90, and 92, respectively, that maintains the pressure of the fluid 36 in zones "A," "B," and "C" below a selected level. A rotatable knob 68 or other adjusting system included in each pressure relief valve 88, 90, and 92 allows a user to set the maximum pressure level of the fluid 36 in each zone "A," "B," and "C."

Figure 5:
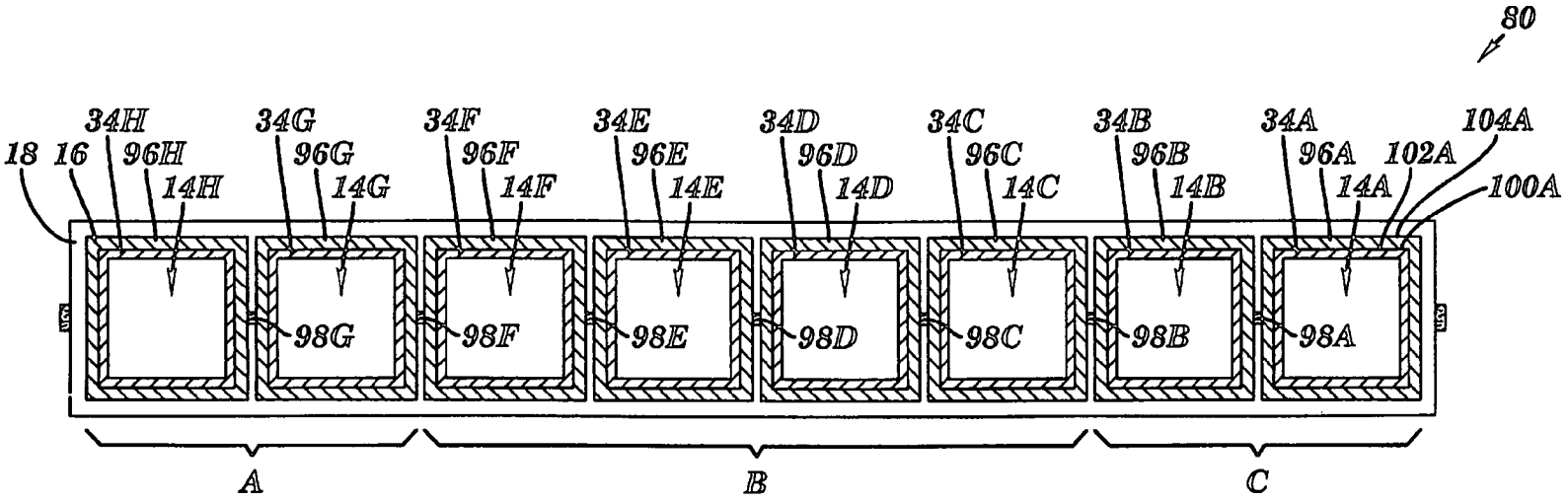
FIG. 5 illustrates a cross-sectional view of the support system apparatus taken along the line 5-5 of FIG. 4.
Figure 6:
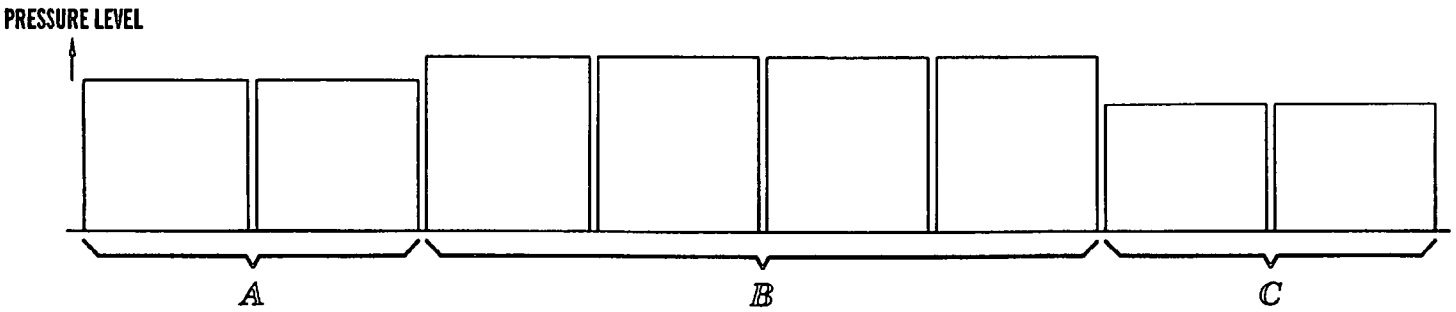
FIG. 6 illustrates an example of a pressure distribution in a plurality of zones in the support system apparatus of FIG. 5.

FIG. 5 illustrates a cross-sectional view of the support system apparatus 80 and zones "A," "B," and "C" taken along line 5-5 of FIG. 4. When atomospheric air is supplied to the fluid supply reservoir 52, there is no need for blowers or pumps to supply the pressurized fluid 36. Each support cell 14A-14H self-inflates when the weight of the patient 56 is removed as described above for the support system apparatus 12. Each exhaust control system 82, 84 and 86 allows the maximum pressure level of the fluid 36 in each zone "A," "B," and "C" to be individually set. FIG. 6 illustrates an example of different pressure levels set in zones "A," "B," and "C." For example, if the support system apparatus 80 is included in a mattress in a bed (not shown), a different level of pressure or firmness can be provided for the upper, middle, and lower portions of the patient's body 56.

As shown in FIG. 5, the sleeve apparatus 16 includes a cell cover 96 surrounding each support cell 14. Each support cell 14. Each cell cover 96A, 96B, 96C, 96D, 96E, 96F, 96G, and 96H, is attached to each adjacent cell cover 96 by connections 98A, 98B, 98C, 98D, 98E, 98F, and 98G. For example, the connections 98A-98G can be formed by a glued, heat sealed or sewn connection. Each cell cover 96 allows the exterior surface 100 of a corresponding envelope 34 to slide freely along an interior surface 102 of the cell cover 96, without transmitting this movement to an exterior surface 104 of the cell cover 96. For example as illustrated in FIG. 5, the support cell 14A includes the envelope 34A, which is surrounded by the cell cover 96A. The exterior surface 100A of the envelope 34A is free to slide along the interior surface 102A of the cell cover 96A. This sliding movement is not transmitted to the stationary exterior surface 104A of the cell cover 96A. The stationary exterior surface 104A is located on the side of the outer cover 22 (FIG. 11) on which the patient 56 is lying, so that the sliding movement of the envelope 34A is not transmitted to the patient. Therefore, the cell covers 96 of the sleeve apparatus 16 prevent frictional shear force abrasion damage to the skin of the patient 56.

Figure 7:
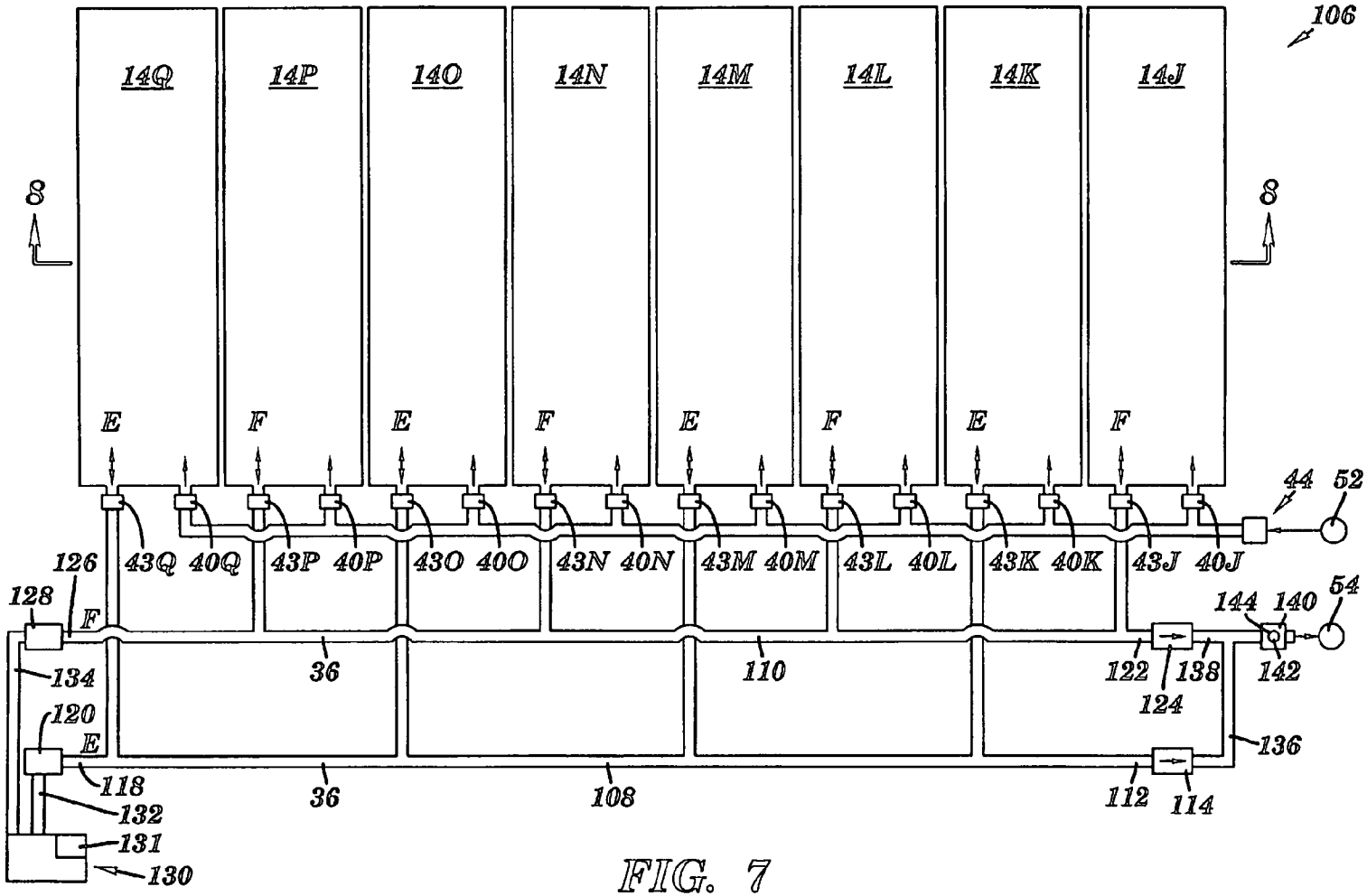
FIG. 7 illustrates a plan view of another embodiment of the support system apparatus including an alternating pressure system.

Another embodiment of a support system apparatus 106, provides an additional alternating pressure system 130 for providing alternating supply pressure to a plurality of zones "E" and "F" as illustrated in FIG. 7. The alternating pressure system 130 can include any means for supplying the fluid 36 under pressure including a pump, compressor, etc. Also, included in the alternating pressure system 130 is any means such as a valve (not shown) for periodically switching the pressurized fluid 36 between conduit 132 and 134. Each support zone "E" and "F," comprises at least one support cell 14. Each support cell 14 includes at least one intake valve 40 and at least one port 43. Each intake valve 40 includes a check valve (not shown) allowing fluid 36 to flow into the support cell 14, while preventing fluid 36 from flowing out of the support cell 14. Each port 43 allows unimpeded fluid 36 flow into or out of the support cell 14. As illustrated in FIG. 7, each intake valve 40J-40Q is connected to the intake control system 44.

The ports 43Q, 430, 43M, and 43K in zone "E" are connected to conduit 108. The ports 43J, 43L, 43N, and 43P in zone "F" are connected to conduit 110. A first end 112 of conduit 108 is connected to a check valve 114, and a second end 118 of conduit 108 is connected to a shut off valve 120. A first end 122 of conduit 110 is connected to a check valve 124, and a second end 126 of the conduit 110 is connected to a shut off valve 128. Conduit 132 connects the shut off valve 120 with the alternating pressure system 130. Conduit 134 connects the shut off valve 128 with the alternating pressure system 130. Conduits 136 and 138 connect the check valve 114 and the check valve 124 with the exhaust control system 140.

The shut off valve 120 can be a "quick disconnect" type that allows fluid 36 to flow through the shut off valve 120 when the conduit 132 is connected, and prevents any flow of the fluid 36 flow when the conduit 132 is disconnected. The shut off valve 128 can also be a "quick disconnect" type that allows fluid 36 to flow through the shut off valve 128 when the conduit 134 is connected, and prevents any flow of the fluid 36 when the conduit 134 is disconnected. Check valve 114 allows fluid 36 to flow from conduit 108 into conduit 136, and prevents fluid 36 from flowing from conduits 136 and 138 into conduit 108. Check valve 124 allows fluid 36 to flow from conduit 110 into conduit 138, and prevents fluid 36 from flowing from conduits 138 and 136 into conduit 110. The exhaust control system 140 includes a pressure relief valve 142 similar to the pressure relief valves described above.

When shut off valves 120 and 128 are closed, the pressure relief valve 142 maintains the pressure of the fluid 36 below a selected level in the conduits 108 and 110. Each intake valve 40J-40Q allows fluid 36 to flow into each support cell 14J-14Q, respectively, while preventing fluid 36 from flowing out of each support cell 14J-14Q, respectively, (FIG. 7). Each intake valve 40J-40Q is connected to the intake control system 44, which is connected to the fluid supply reservoir 52. Generally, the fluid 36 included in the fluid supply reservoir 52 is atmospheric air, however, any other suitable fluids can be used. Conduits 108 and 110 are connected through ports 43J-43Q to the zones "E" and "F." Therefore, the pressure relief valve 142 maintains the pressure of the fluid 36 below a selected level in zones "E" and "F." A rotatable knob 144 or other adjusting system included in the pressure relief valve 142 allows a user to set the maximum pressure of the fluid 36 in the zones "E" and "F." The pressure relief valve 142 is connected to the fluid exhaust reservoir 54. When using atmospheric air, and with the shut off valves 120 and 128 closed, the support system apparatus 106 is self-inflating and self-adjusting.

The alternating pressure system 130 supplies alternating high and low pressure fluid 36 to conduits 108 and 110. When conduit 132 is connected to shut off valve 120, and as conduit 134 is connected to shut off valve 128, the alternating pressure is supplied to conduits 108 and 110. The conduits 108 and 110 supply the alternating fluid 36 pressure to zones "E" and "F."

Figure 8:
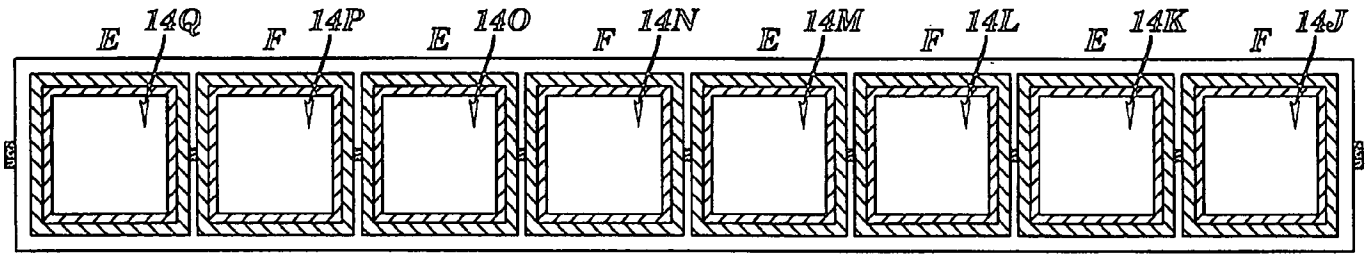
FIG. 8 illustrates a cross-sectional view of the support system apparatus taken along the line 8-8 of FIG. 7.
Figure 9:
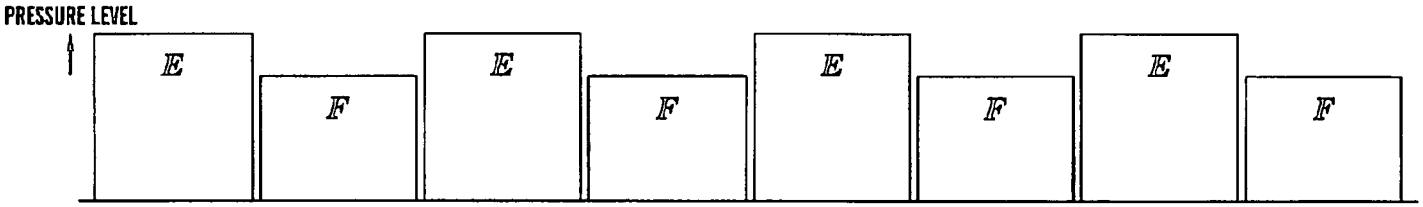
FIG. 9 illustrates a first pressure distribution pattern provided by the alternating pressure system in the plurality of support cells of FIG. 8.

For example, a high pressure fluid 36 may be supplied to the conduit 108 from the alternating pressure system 130, and a low pressure fluid 36 may be supplied to conduit 110, creating a high fluid 36 pressure in zone "E" and a low fluid 36 pressure in zone "F." The fluid 36 flows through check valve 114 to conduit 136 and 138, but is prevented by check valve 124 from flowing into conduit 110. The fluid 36 flow provided by the alternating pressure system 130 is much higher than the flow passing out through the pressure relief valve 142, so that the high pressure fluid 36 fills the zone "E" support cells 14K, 14M, 140, and 14Q as illustrated in FIG. 8. FIG. 9 illustrates the pressure levels in the support cells in zones "E" and "F". For this condition, the support cells 14 in zone "E" rise under the patient 56 and the support cells 14 in zone "F" lower under the patient 56.

Figure 10:
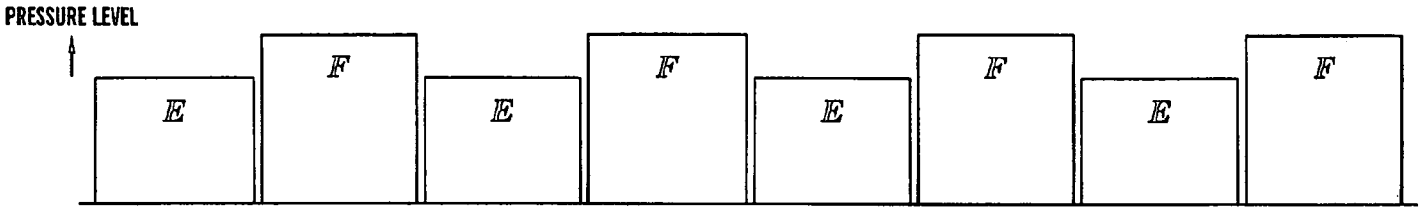
FIG. 10 illustrates a second pressure distribution pattern provided by the alternating pressure system in the plurality of support cells of FIG. 8.

Next, a high fluid 36 pressure is supplied to conduit 110 and a low fluid 36 pressure is supplied to conduit 108, forcing a high pressure fluid 36 into zone "F" and a low pressure fluid 36 into zone "E". The fluid 36 flows through check valve 124 to conduit 138 and 136, but is prevented by check valve 114 from flowing back into the conduit 108. The fluid 36 flow provided by the alternating pressure system 130 is much higher than the flow passing out through the pressure relief valve 142, so that the high pressure fluid 36 fills the zone "F" support cells 14J, 14L, 14N, and 14P. FIG. 10 illustrates the pressure levels in the support cells 14 in zones "E" and "F." For this condition, the zone "F" support cells 14 rise under the patient 56 and the zone "E" support cells 14 lower under the patient 56.

The alternating rising and lowering of the support cells 14 in the zones "E" and "F" under the patient 56, provides beneficial movement of the skeleton and tissue in the patient 56. The movement helps stimulate circulation and lymph fluid movement in the patient 56.

The alternating pressure system 130 includes a computerized control system 131 that is programmed to supply alternating pressures to a plurality of support cells 14 in any sequence that is desired by the user.

Figure 16:
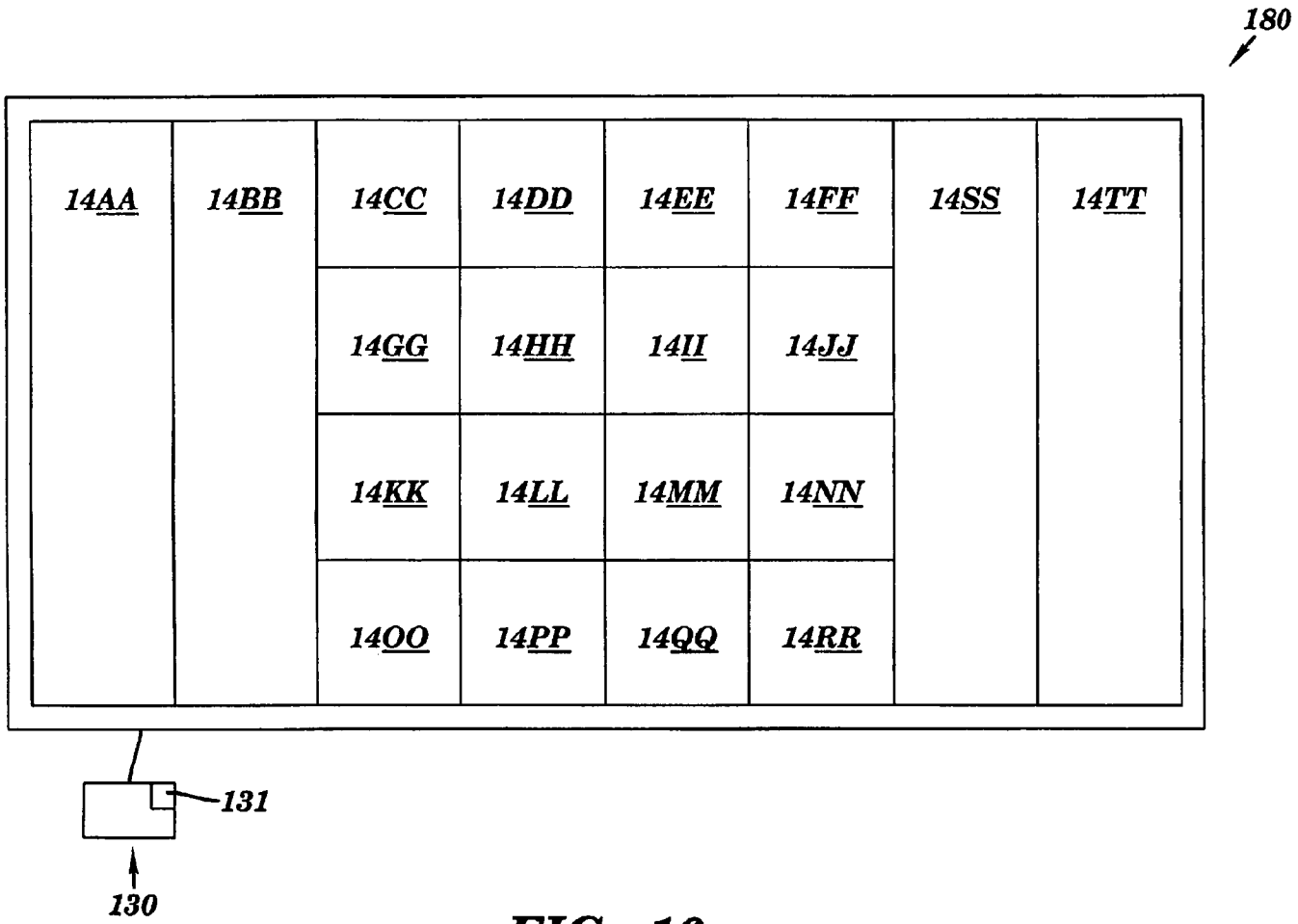
FIG. 16 illustrates a plan view of another embodiment of a cushion device with alternating pressure support cells.

Another embodiment of a support system apparatus 180 with a plurality of support cells 14 is illustrated in FIG. 16. This embodiment shows another example of the shape of support cells 14AA-14SS. The support cells 14 can be interconnected in a manner similar to the support system apparatus 12 and the support system apparatus 106 to provide the support system apparatus 180 with self-inflating, self-adjusting, zoned pressure control, and alternating pressure support and movement to a person lying on the support system apparatus 180. The computerized control system 131 included in the alternating pressure system 130 may be programmed to supply alternating pressures to the plurality of the support cells 14AA-14SS in any sequence that is desired by the user.

Figure 11:
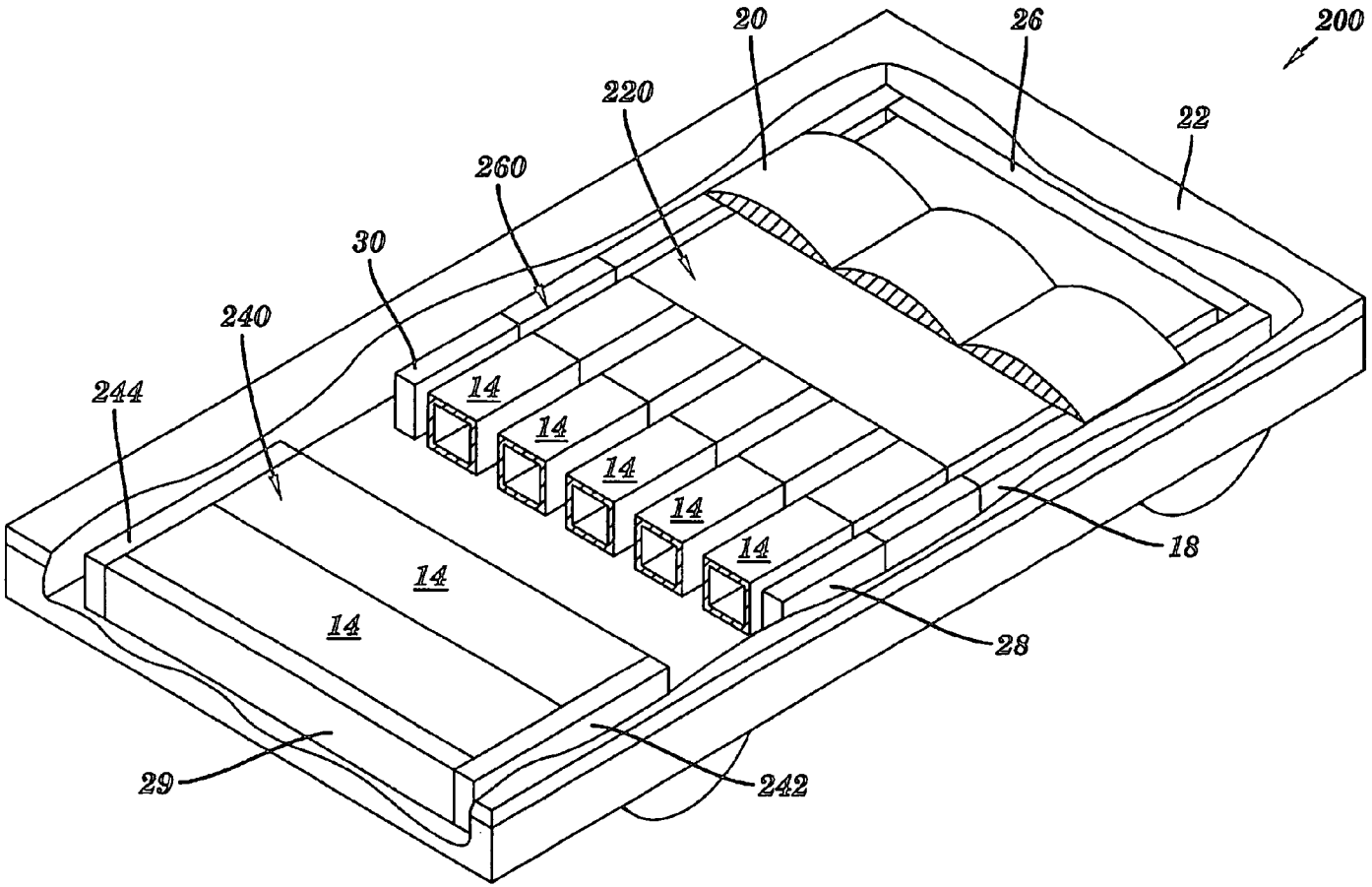
FIG. 11 illustrates a cut-away perspective view of a mattress cushioning device.

FIG. 11 illustrates a cut-away perspective view of a mattress cushioning device 200. The mattress cushioning device 200 includes a torso support system 220, a heel support system 240, and a sleeve apparatus 260, the jacket 18, the topper cushion 20, and the outer cover 22. The torso support system apparatus 220 includes a plurality of support cells 14, the side wall 28, the end wall 26, and the side wall 30. The side walls 28 and 30 and the end wall 26 are formed from a resilient material. The sleeve apparatus 260 includes cell covers 96. Each cell cover 96 surrounds a support cell 14 to prevent sliding and frictional motion to be transmitted to the patient 56. The support cells 14 provide self-inflating and self-adjusting pressure support to the torso region of a patient 56 resting on the support system apparatus 220. The support cells 14 extend in a longitudinal direction of the mattress cushioning device 200. Also, alternating pressure can be applied to the individual support cells 14 under the patient 56 to provide therapeutic movement to the body of the patient 56.

The heel support system apparatus 240 includes a plurality of support cells 14, the end wall 29, a side wall 242, and a side wall 244. The heel support system 240 provides support for the heel area of a patient 56. The support cells 14 extend in a transverse direction on the mattress cushioning device 200.

The jacket 18 surrounds the torso support system apparatus 220 and the heel support system apparatus 240. The topper cushion 20 lies on top of the jacket 18 and provides further cushioning and comfort to the patient 56. The topper cushion 20 can be composed of any resilient material, for example, foam, down feathers, an inflatable air cushion, etc.

Figure 12:
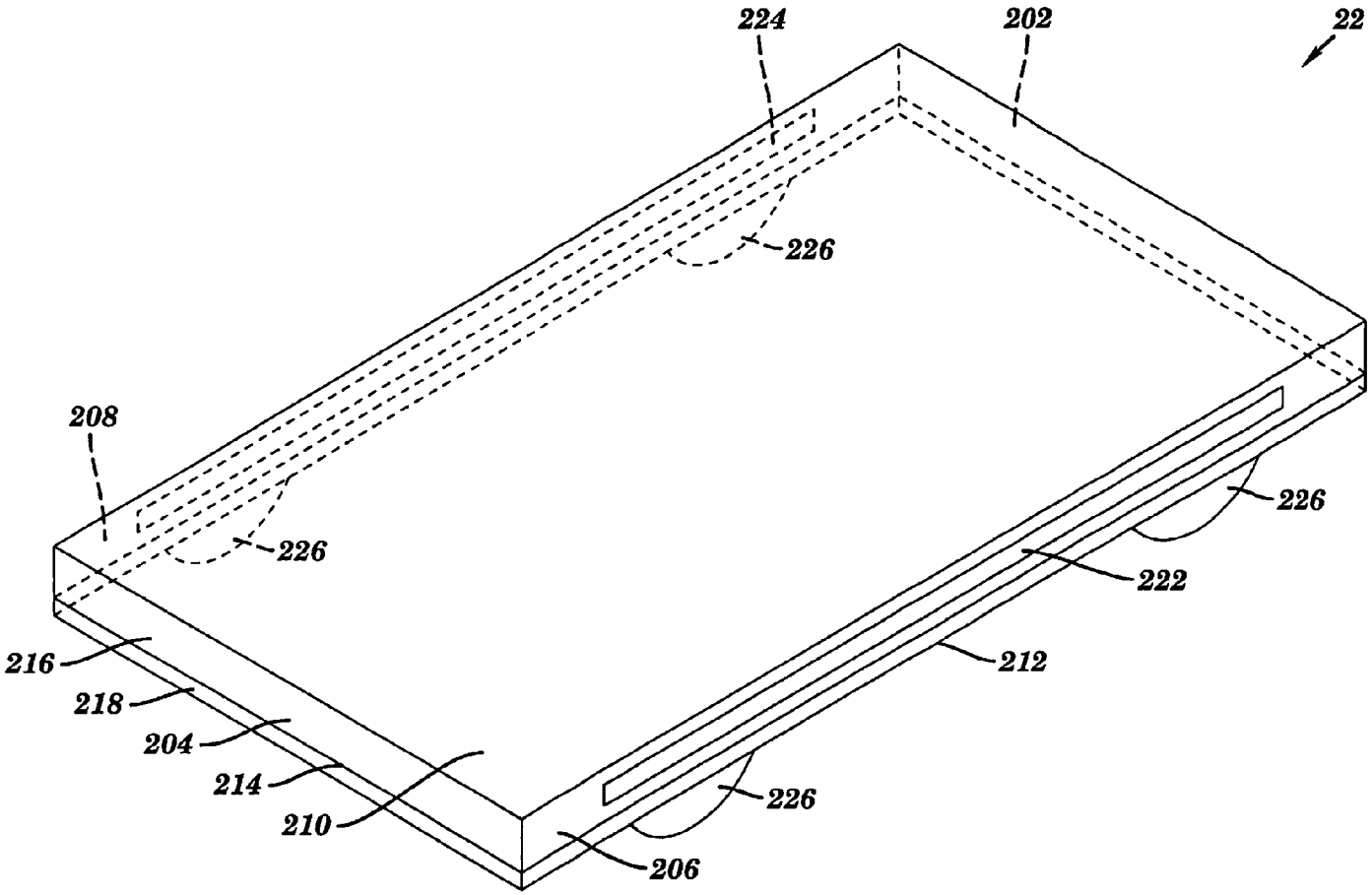
FIG. 12 illustrates a perspective view of the mattress cushioning device with an outer cover.

The outer cover 22 is illustrated in FIGS. 11 and 12. The outer cover 22 of the mattress cushioning device 200 provides a low friction and low shear surface further protecting the patient 56 from frictional tissue damage. Additionally, the outer cover 22 provides a waterproof and stain resistant surface. For medical uses the outer cover 22 can be made from an anti-microbial type material. The outer cover 22 includes end walls 202 and 204, side walls 206 and 208, a top wall 210 and a bottom wall 212. A closure 214 joins an upper portion 216 to a lower portion 218 of the outer cover 22. The closure 214 may comprise, for example, a zipper, snaps, hook and eye fasteners, etc. The side walls 206 and 208 can include stretchable panels 222 and 224 that allows the outer cover 22 to expand and contract as the support cells 14 rise and fall within the outer cover 22. The displacement of the support cells 14 is accommodated by the stretchable panels 222 and 224 so that stretching of the top wall 210 is prevented. Thus, the top wall does not transmit shear forces to the patient 56 resting on the top wall 210. Flexible handles 226 can be attached to the outer cover 22 to allow a user to grasp and move the mattress cushioning device 200.

Figure 15:
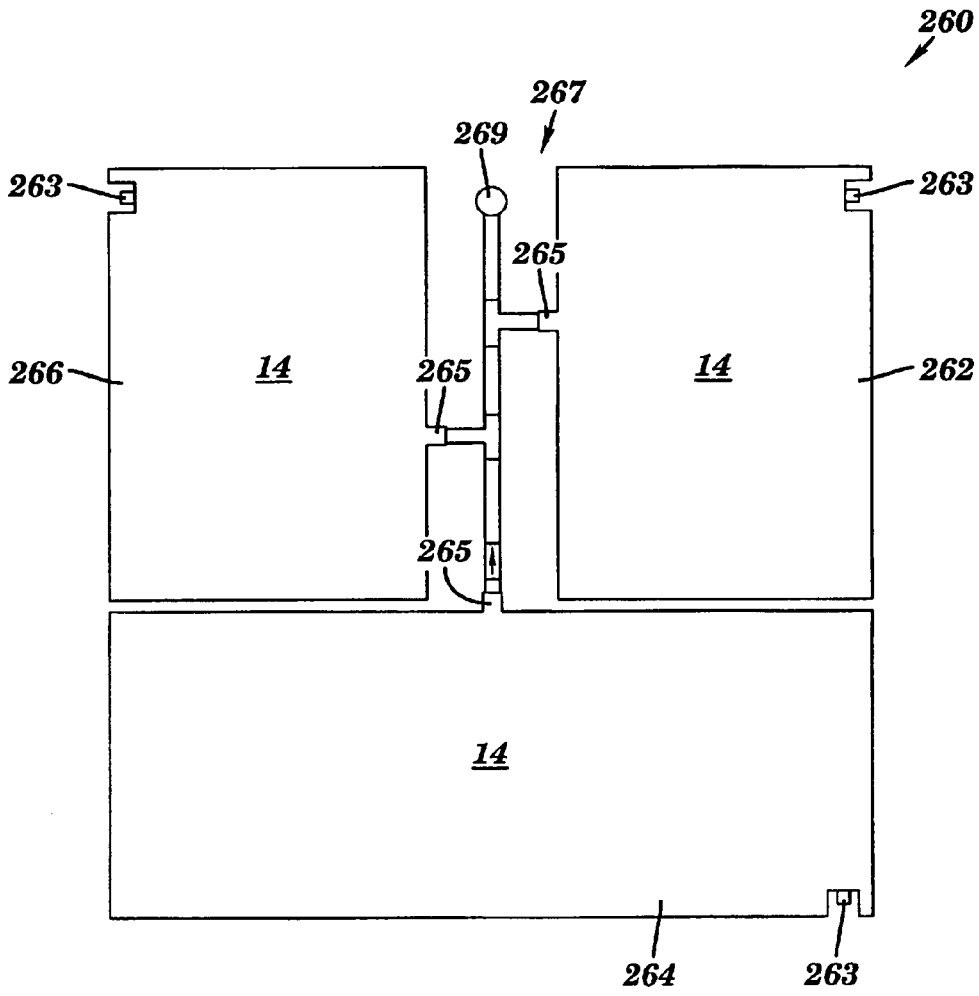
FIG. 15 illustrates a perspective view of a chair seat cushioning device.

An embodiment of a seat cushioning device 260 in accordance with the present invention is illustrated in FIG. 15. The seat cushioning device 260 includes three supporting sections 262, 264, and 266. Each section 262, 264, and 266 includes at least one support cell 14. The support cells 14 can be interconnected in a manner similar to the support system apparatus 12, the support system apparatus 180, and the support system apparatus 106 to provide the seat cushioning device 260 with self-inflating, self-adjusting, zoned pressure control, and alternating pressure support and movement to a person sitting on the seat cushioning device 260. For example, the supporting sections 262, 264, and 266 may each include an intake valve 263 and an exhaust valve 265. The exhaust valves 265 are interconnected by an exhaust control system 267 having a controllable pressure relief valve 269. As in previous embodiments of the present invention, the pressure relief valve 269 is provided to control the maximum pressure level of the fluid in each of the supporting sections 262, 264, and 266.

The foregoing description of the present invention has been presented for purposes of illustration and description. It is not intended to be exhaustive or to limit the invention to the precise form disclosed, and many modifications and variations are possible in light of the above teaching. For example, the cushioning device of the present invention is suitable for providing self-inflating, self-adjusting, zoned pressure control, and alternating pressure support to any supported body. Also, the cushioning device of the present invention is suitable for any application where low interface pressure is required between the cushioning device and the surface of the body being supported. Such modifications and variations that may be apparent to a person skilled in the art are intended to be included within the scope of this invention as defined by the accompanying claims.

What is claimed is:

1. A body support comprising:

a plurality of fluid cells, wherein each fluid cell includes a reforming element; and a non-powered manifold system including an exhaust conduit interconnecting at least two of the fluid cells.

2. The body support of claim 1, further comprising:

a separate controllable pressure relief valve operatively attached to the exhaust conduit.

3. A body support comprising:

a plurality of self-inflating fluid cells, wherein each fluid cell includes a reforming element;

a manifold system including an exhaust conduit interconnecting at least two of the fluid cells; and means, operatively attached to the exhaust conduit for adjusting the firmness or softness of all of the fluid cells.

4. A body support comprising:

a plurality of self-inflating fluid cells;

a manifold system including an exhaust conduit interconnecting at least two of the fluid cells;

a pressure regulator attached to the exhaust conduit; and a separate controllable pressure relief valve operatively attached to each said fluid cell.

5. The body support of claim 4, wherein each fluid cell includes a reforming element.

6. A body support comprising:

a plurality of fluid cells;

a pressure regulator; and a manifold system including an exhaust conduit interconnecting at least two of the fluid cells; wherein the fluid cells do not communicate with each other through the exhaust conduit and all fluid cells communicate with the pressure regulator through the exhaust conduit.

7. A method for supporting a body comprising:

providing a plurality of non-powered self-inflating fluid cells interconnected with an exhaust conduit;

applying a body weight to the non-powered self-inflating fluid cells; and allowing each of the non-powered self-inflating fluid cells to react to the body weight and adjust to an identical internal pressure through the exhaust conduit.

8. A cushioning device comprising:

a plurality of envelopes containing a fluid for supporting a load;

a fluid supply reservoir;

a fluid exhaust reservoir;

an intake valve for each envelope, wherein the intake valve allows fluid to flow from the fluid supply reservoir into the envelope, and prevents fluid from flowing from the envelope to the fluid supply reservoir;

an exhaust valve for each envelope, wherein the exhaust valve in each envelope allows fluid to flow from each envelope into the fluid exhaust reservoir, and prevents fluid from flowing between envelopes, and wherein the exhaust valves are arranged into at least one group;

a separate controllable pressure relief valve connected to each group of exhaust valves for controlling fluid flowing from each group of exhaust valves to the fluid exhaust reservoir; and a reforming element within each envelope for non-powered self-inflation of the envelope.

9. The cushioning device according to claim 8, wherein the fluid is atmospheric air.

10. The cushioning device according to claim 8, wherein the reforming element comprises a resilient material.

11. The cushioning device according to claim 8, wherein each pressure relief valve is user adjustable.

12. The cushioning device according to claim 8, wherein the cushioning device is in the form of a mattress for a bed.

13. The cushioning device according to claim 8, wherein the cushioning device is in the form of a seat for a chair.

14. The cushioning device of claim 8, further including a sleeve apparatus surrounding the envelopes to prevent the transmission of shear forces to a body contacting the sleeve apparatus.

15. The cushioning device of claim 14, further including a plurality of interconnected cell covers, wherein each cell cover surrounds one of the envelopes allowing the envelope to freely move within the cell cover.

16. The cushioning device of claim 14, further including a jacket containing the sleeve apparatus and the plurality of envelopes.

17. The cushioning device of claim 8, further including a topper positioned above the plurality of envelopes to provide further cushioning.

18. The cushioning device of claim 8, further including an outer cover having a low friction and low shear surface.

19. The cushioning device according to claim 18, wherein the outer cover further includes at least one stretchable panel to provide expansion space.

20. A body support comprising:

a plurality of self-inflating fluid cells;

a manifold system including an exhaust conduit interconnecting at least two of the fluid cells; and a pressure regulator attached to the exhaust conduit wherein the pressure of each fluid cell is independent of the pressure of each other fluid cell.

*21. A body support comprising:*

*at least three fluid cells, wherein each fluid cell includes a reforming element;*

*a non-powered manifold system includes a plurality of exhaust conduits that interconnects the at least three fluid cells.*

*22. The body support of claim 21, further comprising:*

*a first set of at least two fluid cells;*

*a second set of at least two fluid cells; wherein a first exhaust conduit interconnects the first set; and*

*a second exhaust conduit interconnects the second set.*

*23. A body support comprising:*

*at least three fluid cells, wherein each fluid cell includes a reforming element;*

*a non-powered manifold system that interconnects an internal fluid cell to an external fluid cell.*

*24. A body support comprising:*

*a plurality of self-inflating fluid cells, wherein each fluid cell includes a reforming element;*

*a manifold system including an exhaust conduit interconnecting each of the fluid cells; and*

*means, operatively attached to the exhaust conduit for adjusting the firmness or softness of all of the fluid cells.*

*25. The body support of claim 24, wherein the plurality of self-inflating fluid cells are at least three.*

*26. A body support comprising:*

*at least three fluid cells, wherein each said fluid cell includes a reforming element; and*

*a non-powered manifold system including an exhaust conduit that interconnects at least two fluid cells of the at least three fluid cells, wherein a first fluid cell of the at least two fluid cells is an interior fluid cell of the at least three fluid cells.*

*27. The body support of claim 26, wherein the exhaust conduit interconnects a minimum of three fluid cells of the at least three fluid cells.*

*28. The body support of claim 26, wherein two fluid cells of the at least two fluid cells are adjacent fluid cells.*

*29. The body support of claim 26, wherein the exhaust conduit does not directly interconnect two end cells of the at least three fluid cells to each other.*

*30. The body support of claim 26, further comprising a separate controllable pressure relief valve operatively attached to each said fluid cell.*

*31. A body support comprising:*

*at least three self-inflating fluid cells, wherein each said fluid cell includes a reforming element;*

*a manifold system including an exhaust conduit that interconnects at least two fluid cells of the at least three fluid cells, wherein a first fluid cell of the at least two fluid cells is an interior fluid cell of the at least three fluid cells; and*

*means, operatively attached to the exhaust conduit for adjusting the firmness or softness of all of the at least three fluid cells.*

*32. The body support of claim 31, wherein the exhaust conduit interconnects a minimum of three fluid cells of the at least three fluid cells.*

*33. The body support of claim 31, wherein two fluid cells of the at least two fluid cells are adjacent fluid cells.*

*34. The body support of claim 31, wherein the exhaust conduit does not directly interconnect two end cells of the at least three fluid cells to each other.*

*35. The body support of claim 31, further comprising a separate controllable pressure relief valve operatively attached to each said fluid cell.*

*36. A body support comprising:*

*at least three self-inflating fluid cells;*

*a manifold system including an exhaust conduit that interconnects at least two fluid cells of the at least three fluid*

*cells, wherein a first fluid cell of the at least two fluid cells is an interior fluid cell of the at least three fluid cells;*

*a pressure regulator attached to the exhaust conduit; and*

*a separate controllable pressure relief valve operatively attached to each said fluid cell.*

*37. The body support of claim 36, wherein the exhaust conduit interconnects a minimum of three fluid cells of the at least three fluid cells.*

*38. The body support of claim 36, wherein two fluid cells of the at least two fluid cells are adjacent fluid cells.*

*39. The body support of claim 36, wherein the exhaust conduit does not directly interconnect two end cells of the at least three fluid cells to each other.*

*40. The body support of claim 36, wherein each said fluid cell includes a reforming element.*

*41. A body support comprising:*

*at least three fluid cells;*

*a pressure regulator; and*

*a manifold system including an exhaust conduit that interconnects at least two fluid cells of the at least three fluid cells, wherein a first fluid cell of the at least two fluid cells is an interior fluid cell of the at least three fluid cells, and wherein the fluid cells do not communicate with each other through the exhaust conduit and all fluid cells communicate with the pressure regulator through the exhaust conduit.*

*42. The body support of claim 41, wherein the exhaust conduit interconnects a minimum of three fluid cells of the at least three fluid cells.*

*43. The body support of claim 41, wherein two fluid cells of the at least two fluid cells are adjacent fluid cells.*

*44. The body support of claim 41, wherein the exhaust conduit does not directly interconnect two end cells of the at least three fluid cells to each other.*

*45. A method for supporting a body comprising:*

*providing at least three non-powered self-inflating fluid cells interconnected with an exhaust conduit;*

*applying a body weight to the non-powered self-inflating fluid cells; and*

*allowing each of the non-powered self-inflating fluid cells to react to the body weight and adjust to an identical internal pressure through the exhaust conduit.*

*46. The body support of claim 45, wherein a first fluid cell of the at least three fluid cells is an interior fluid cell of the at least three fluid cells.*

*47. The body support of claim 45, wherein two fluid cells of the at least three fluid cells are adjacent fluid cells.*

*48. The body support of claim 45, wherein the exhaust conduit does not directly interconnect two end cells of the at least three fluid cells to each other.*

*49. A cushioning device comprising:*

*at least three envelopes containing a fluid for supporting a load;*

*fluid supply reservoir;*

*a fluid exhaust reservoir;*

*an intake valve for each envelope, wherein the intake valve allows fluid to flow from the fluid supply reservoir into the envelope, and prevents fluid from flowing from the envelope to the fluid supply reservoir;*

*an exhaust valve for each envelope, wherein the exhaust valve in each envelope allows fluid to flow from each envelope into the fluid exhaust reservoir, and prevents fluid from flowing between envelopes, wherein the exhaust valves are arranged into at least one group, and wherein an exhaust conduit does not directly interconnect two end envelopes of the at least three envelopes to each other;*

*a separate controllable pressure relief valve connected to each group of exhaust valves for controlling fluid flowing from each group of exhaust valves to the fluid exhaust reservoir; and*

*a reforming element within each envelope for non-powered self-inflation of the envelope.*

*50. The cushioning device of claim 49, wherein the fluid is atmospheric air.*

*51. The cushioning device of claim 49, wherein the reforming element comprises a resilient material.*

*52. The cushioning device of claim 49, wherein each pressure relief valve is user adjustable.*

*53. The cushioning device of claim 49, wherein the cushioning device is in the form of a mattress for a bed.*

*54. The cushioning device of claim 49, wherein the cushioning device is in the form of a seat for a chair.*

*55. The cushioning device of claim 49, further including a sleeve apparatus surrounding the envelopes to prevent the transmission of shear forces to a body contacting the sleeve apparatus.*

*56. The cushioning device of claim 55, further including a plurality of interconnected cell covers, wherein each cell cover surrounds one of the envelopes allowing the envelope to freely move within the cell cover.*

*57. The cushioning device of claim 55, further including a jacket containing the sleeve apparatus and the plurality of envelopes.*

*58. The cushioning device of claim 49, further including a topper positioned above the plurality of envelopes to provide further cushioning.*

*59. The cushioning device of claim 49, further including an outer cover having a low friction and low shear surface.*

*60. The cushioning device according to claim 59, wherein the outer cover further includes at least one stretchable panel to provide expansion space.*

*61. A body support comprising:*

*at least three self-inflating fluid cells;*

*a manifold system including an exhaust conduit interconnecting at least two fluid cells of the at least three self-inflating fluid cells, wherein a first fluid cell of the at least two fluid cells is an interior fluid cell of the at least three self-inflating fluid cells; and*

*a pressure regulator attached to the exhaust conduit wherein the pressure of each fluid cell is independent of the pressure of each other fluid cell.*

*62. The body support of claim 61, wherein the exhaust conduit interconnects a minimum of three fluid cells of the at least three self-inflating fluid cells.*

*63. The body support of claim 61, wherein two fluid cells of the at least two fluid cells are adjacent fluid cells.*

*64. The body support of claim 61, wherein the exhaust conduit does not directly interconnect two end cells of the at least three self-inflating fluid cells to each other.*

* * * * *